(No Model.) 3 Sheets—Sheet 1.

J. W. WARRICK.
CORN HARVESTER AND HUSKER.

No. 597,041. Patented Jan. 11, 1898.

WITNESSES:
Edward Thorpe
J. Schecker

INVENTOR
J. W. Warrick
BY
ATTORNEYS.

(No Model.)

3 Sheets—Sheet 2.

J. W. WARRICK.
CORN HARVESTER AND HUSKER.

No. 597,041. Patented Jan. 11, 1898.

WITNESSES:
Edward Thorpe

INVENTOR
J. W. Warrick.
BY
ATTORNEYS.

(No Model.)  3 Sheets—Sheet 3.
J. W. WARRICK.
CORN HARVESTER AND HUSKER.
No. 597,041. Patented Jan. 11, 1898.
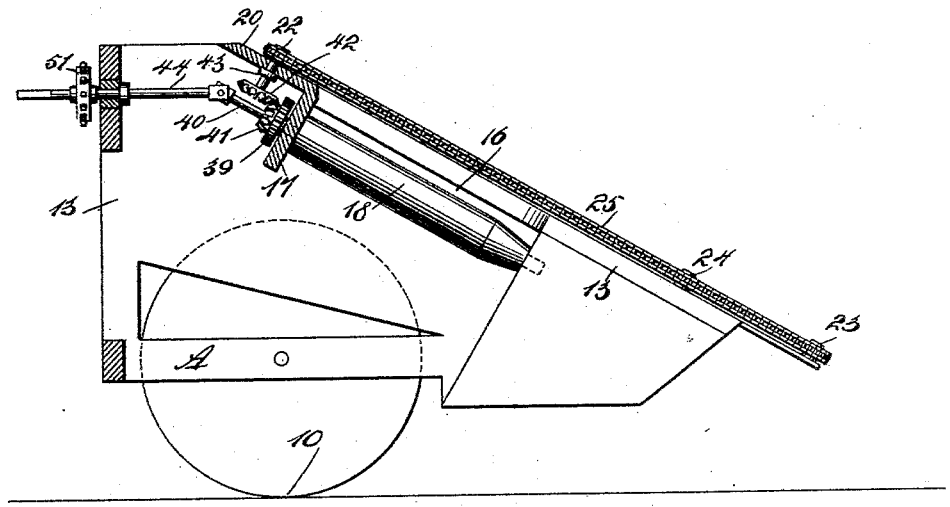
WITNESSES:
Edward Thorpe
INVENTOR
J. W. Warrick
BY
ATTORNEYS.

UNITED STATES PATENT OFFICE.

JAMES W. WARRICK, OF WILLIAMSPORT, INDIANA.

CORN HARVESTER AND HUSKER.

SPECIFICATION forming part of Letters Patent No. 597,041, dated January 11, 1898.

Application filed February 10, 1897. Serial No. 622,740. (No model.)

*To all whom it may concern:*

Be it known that I, JAMES W. WARRICK, of Williamsport, in the county of Warren and State of Indiana, have invented a new and Improved Corn Harvester and Husker, of which the following is a full, clear, and exact description.

The object of the invention is to provide a corn-husking machine especially adapted to be used in the field and to remove the ears of corn from the standing stalks, husk said ears, and deliver the husked ears to a vehicle or other receptacle placed alongside of the husker.

A further object of this invention is to so construct the husking-machine that it may be operated by hand when stationary, enabling the ears of corn from cut stalks to be fed therein and husked.

Another object of the invention is to construct the corn-husker in an exceedingly simple, durable, and economic manner.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
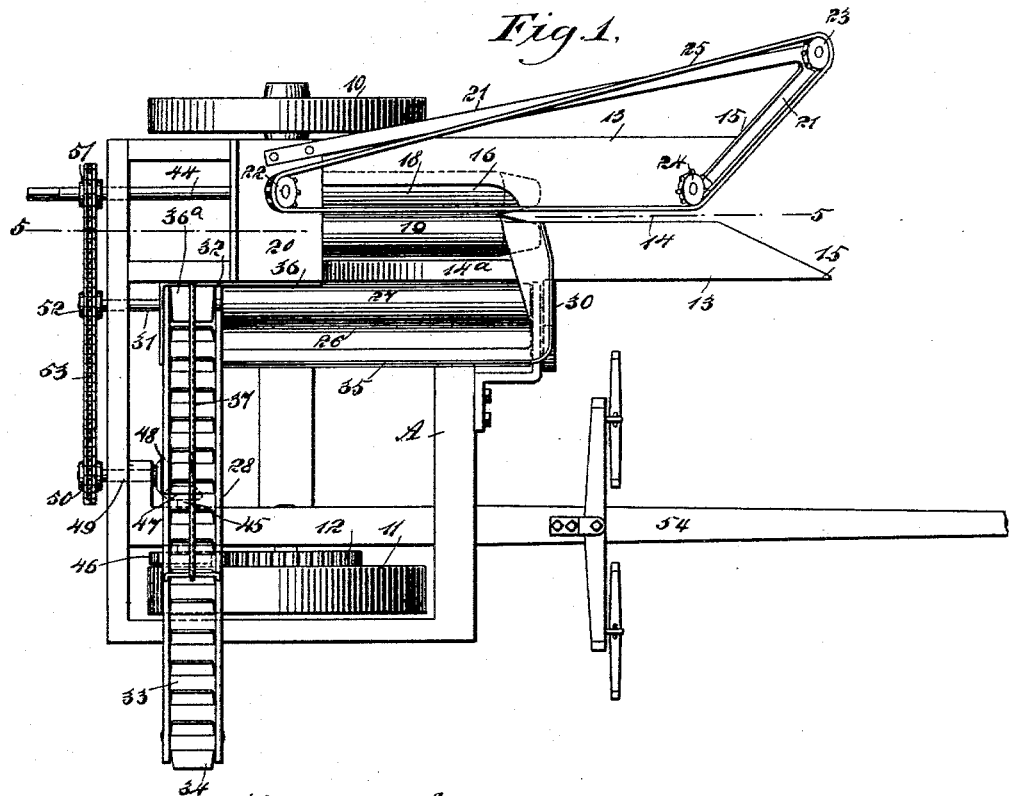
Figure 2:
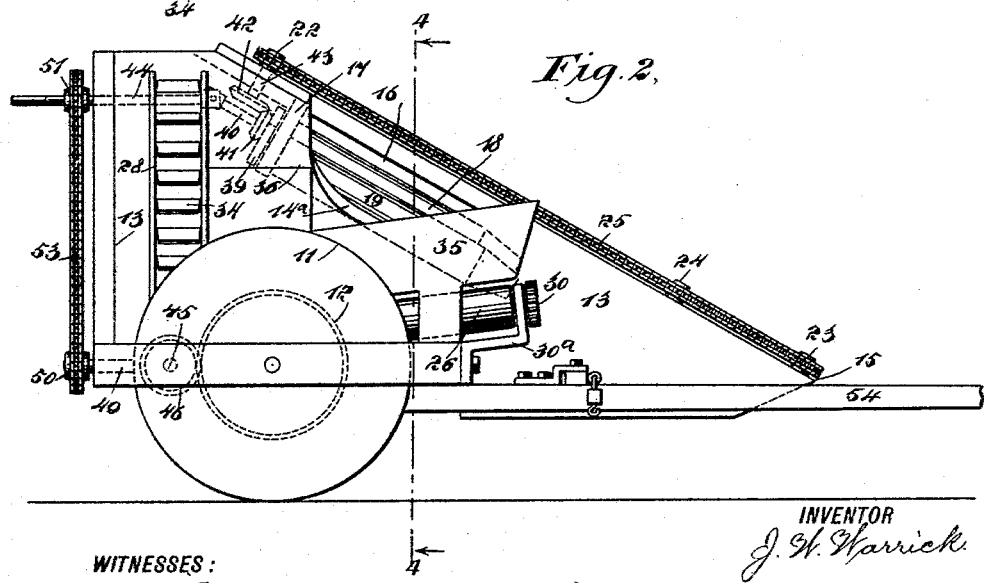
Figure 3:
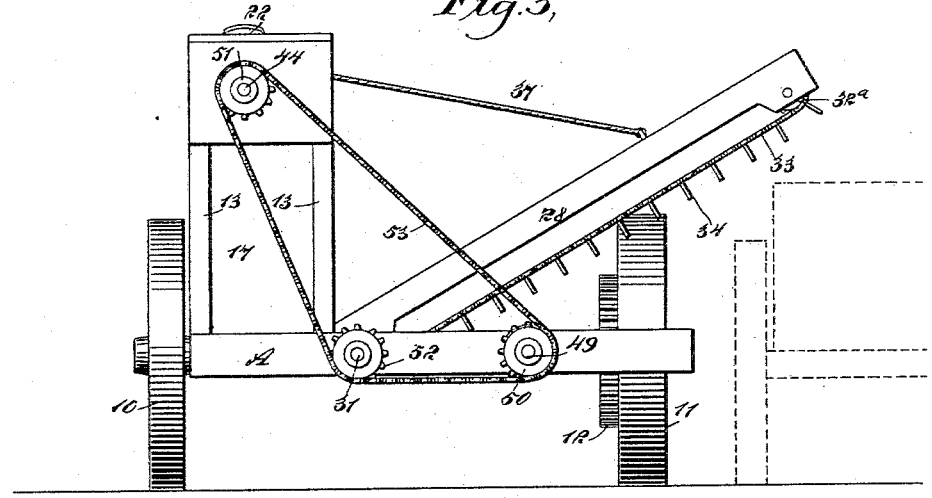
Figure 4:
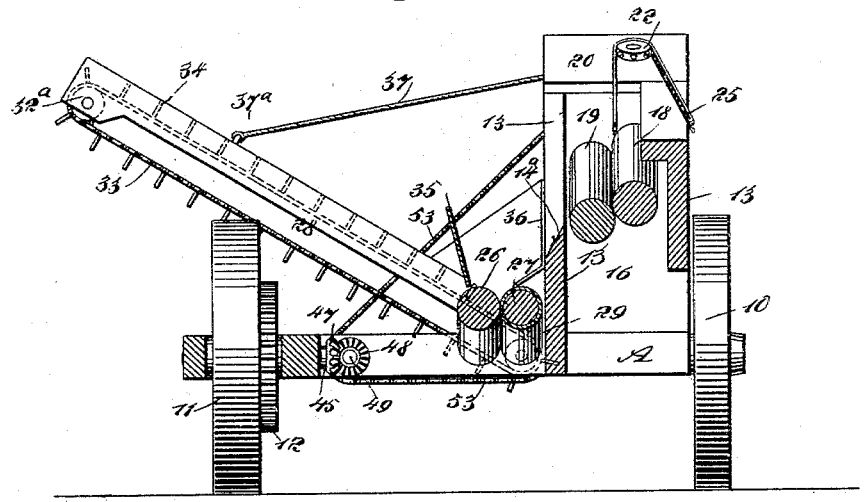

Figure 1 is a plan view of the machine. Fig. 2 is a side elevation of the machine. Fig. 3 is a rear elevation. Fig. 4 is a vertical section taken substantially on the line 4 4 of Fig. 2, and Fig. 5 is a longitudinal section taken on the line 5 5 of Fig. 1.

The frame A is provided with an axle at each side, and upon the axles supporting-wheels 10 and 11 are journaled, the right-hand supporting-wheel 11 being the driver, and to that end a gear 12 is secured to the supporting-wheel. Two parallel partitions 13 are located at the left-hand side of the frame, extending from the back of the frame forwardly a predetermined distance beyond the front. The upper edges of these partitions are beveled downwardly and forwardly, the back portions of the partitions being quite high and the forward portion of the partitions being arranged to quite closely approach the ground. The two partitions 13 are made quite thick at their forward portions, so as to provide a narrow space 14 between them, as shown in Fig. 1. Back of this narrow space or thickened portion of the partitions a chamber 16 is formed, closed at the back by a plate 17 or the equivalent of the same.

At the extreme forward ends of the partitions 13 the inner edges of said partitions are beveled in opposite directions, making a substantially V-shaped approach to the narrow space or channel 14 between the partitions and forming also fingers 15, the fingers being adapted to engage with the stalks that may be bent down and raise the same, so that said stalks and the ears thereon may be conducted to the chamber 16.

Within the chamber 16 two snapping-rollers 18 and 19 are journaled, the forward ends of the rollers, which are conical, being journaled in the rear end portion of the thickened parts of the partitions, while the rear ends of the rollers are journaled in the back wall 17 of the chamber 16. The rollers are given an inclination corresponding to the inclination of the upper edges of the partitions 13, and one roller is placed slightly above the other; but the two rollers are mounted to revolve in close proximity to each other. The highest roller is the left-hand or outer roller, as shown in Fig. 4. These rollers receive the stalks, and as the machine is drawn forward the stalks are drawn between the rollers and the ears of corn are husked and separated from the stalks, the rollers biting or so engaging with the husk as to tear it and the silk from the ear, leaving the husk on the stalk. By placing one roller above the other, as illustrated and just described, the snapping of the ears from the stalks is accomplished in a quicker and in a more effectual manner than if the rollers were in the same transverse plane. The improved arrangement of the rollers, which is one of the main features of the invention, is also a great advantage in the matter of releasing the stalks. When one roller is placed slightly above the other, as shown, the ears of corn are much more quickly and conveniently discharged from the husking-chamber 16 and delivered to supplemental finishing-rollers 26 and 27, to be hereinafter described.

Just back of the chamber 16 between the partitions a plate 20 is secured on the upper edges of the partitions, and an angle-arm 21 is attached to the left-hand end portion of this plate, the longer member of the arm extending beyond the outer face of the left-hand partition, following the inclination thereof and terminating at a point in advance of said partition, while the shorter member of the arm 21 is secured to the upper face of the left-hand partition 13 at its lower end, following the taper at the lower extremity of the partition. A sprocket-wheel 22 is journaled upon a shaft 43, said shaft extending downward through the plate 20. A second sprocket-wheel 23 is journaled upon the arm 21 at the intersection of its members, while a third sprocket-wheel 24 is journaled on the left-hand partition 13, where the tapering finger portion connects with the inner edge, forming a wall of the narrow space 14.

A sprocket-belt 25 is passed around the sprocket-wheels 22, 23, and 24. Therefore this sprocket-belt follows the tapering surface of the finger portion of the left-hand partition and also extends along one wall of the narrow space 14 between the partitions and over the space between the snapping-rollers 18 and 19, as is also shown in Fig. 1. The auxiliary finishing-rollers 26 and 27, above alluded to, are located near the right-hand partition 13 and extend in direction of the front and rear of the frame. These rollers are higher at their forward than at their rear ends and are placed quite close to each other. At the lower rear ends of the rollers an elevator 28 is located, adapted to receive the ears of corn from the auxiliary or supplemental finishing-rollers and conduct the cleaned ears to a vehicle or receptacle at one side, usually the right-hand side of the machine, since the elevator is made to extend upward and outward over the right-hand side of the frame. The rollers 26 and 27 are adapted to remove any of the husks or silk that may cling to the ears of corn after they have passed through the snapping and husking rollers 18 and 19.

A recess 14ª is made in the upper edge of the right-hand partition 13, so located and so shaped as to direct the ears of corn, after passing through the main husking-rollers, to the forward or higher end portions of the auxiliary or supplemental finishing-rollers 26 and 27. In order that the ears of corn may be thoroughly cleaned from husks and silk, one of the finishing-rollers, preferably the left-hand one, is provided with a covering 29, of canvas or a like material. This canvas serves to catch all the husks and silk that may escape from the snapping and husking rollers and cleans the ear completely, at the same time avoiding shelling of the grain.

Gears 30, arranged to mesh, are located at the forward ends of the finishing-rollers 26 and 27, the forward trunnions of these rollers being journaled in a bracket 30ª. The trunnion 31 of the left-hand roller 27 is carried through and beyond the rear end of the frame A. On this trunnion 31 the lower roller or drum 32 of the elevator 28 is secured, a second roller or drum 32ª being at the upper outer end of the elevator. An endless belt or apron 33 is passed around the upper and lower drums 32 and 32ª of the elevator, and said apron is provided upon its outer face with transverse partitions 34.

A hopper is located over the auxiliary or supplemental finishing-rollers 26 and 27. This hopper is made, preferably, in two sections 35 and 36, each section being usually made of sheet metal. The right-hand section or plate 35 is attached to the right-hand partition 13 at the forward end of the recess 14ª therein, extending from this wall of the recess across the upper forward ends of the rollers, thence rearward longitudinally over the right-hand roller 26 to the forward side of the elevator 28. The section 36 of the hopper extends from the rear wall of the recess 14ª rearward alongside of the right-hand partition 13 and longitudinally over the top of the left-hand or covered roller 27, the rear end of the hopper-section 36 being carried in direction of the right-hand side of the machine to the rear side portion of the elevator. A lip 36ª is carried from the left-hand section 36 of the hopper over the lower drum of the elevator to insure the corn being delivered to the pockets of the apron formed by the partitions 34, as is illustrated in Fig. 1. The elevator may be held at a desired inclination by attaching a rope 37 to a bail 37ª, located at the upper edge of the elevator, the said rope being likewise attached to one of the partitions 13 or to a suitable portion of the frame.

A gear 39 is secured to the upper rear end or edge of the finishing-rollers 18 and 19. The trunnion 40, usually of the left-hand or higher roller 18, for example, is carried beyond the gear connected with this roller and is provided with a beveled gear 41, which meshes with a like gear 42, located on the shaft 43, to which the sprocket-wheel 22, heretofore alluded to, is secured.

The driving-gear is as follows: A shaft 44, which extends rearward beyond the rear end of the machine, is coupled to the trunnion 40 of the snapping-roller 18, as shown in Fig. 2, the rear end of this shaft being preferably squared to receive a crank. A short shaft 45 is journaled transversely in the frame at the right-hand side thereof, the said shaft being provided with a pinion 46, which meshes with the gear 12 on the supporting-wheel 11 and is adapted to be thrown out of gear therewith when desired. The shaft 45 is also provided with a beveled gear 47, meshing with a gear 48, attached to a shaft 49, journaled longitudinally in the rear portion of the frame A, as shown in Fig. 1. The shaft 49 at its rear end is provided with a sprocket-wheel 50, a sprocket-wheel 51 being secured to the rear end of the upper shaft 44, and a third sprocket-wheel 52 is secured upon the rear end of the trunnions 31, carried from the finishing-roller 27. All of these sprocket-wheels 50, 51, and 52 are engaged by one belt 53. It will thus be observed that all the parts are driven from the supporting-wheel 11 and that the driving-gear is made as simple as possible, there being but a single driving-belt.

In operation the cornstalks are conducted to the rollers 18 and 19, passing between these rollers. The ears are husked by the rollers and are delivered by said rollers 18 and 19 to the lower rollers 26 and 27, where the ears are thoroughly cleaned, and are in turn delivered by these lower rollers to the elevator and conducted by it to a receptacle placed to receive the cleaned ears.

The pole or tongue 54 is secured to the frame in any approved manner. Ordinarily, however, the tongue has a hinged connection with the frame to permit the machine to be raised and lowered as required.

When the machine is in the barn, for example, or is located near a stack of corn having ears to be husked, by throwing the pinion 46 out of mesh with the gear 12 and placing a crank on the shaft 44 the husking-rollers may be operated by hand and the stalks be fed by hand to the snapping-rollers, or the ears may be stripped by hand and fed to the finishing-rollers to be husked by them.

In order to operate the machine by hand, as above described, it will be necessary to provide any suitable shifting mechanism (not shown) to throw the gear-wheel 46 out of gear with the wheel 12.

Having thus described my invention, I claim as new and desire to secure by Letters Patent—

1. In a corn-husker, the combination with a chamber or compartment arranged at one side of the machine, substantially parallel gathering-arms communicating at their rear ends with said chamber, and beveled at their forward ends to guide the stalks; a pair of snapping-rolls arranged longitudinally of the gathering-arms, and inclined upwardly from front to rear, a pair of finishing-rolls, arranged in a vertical plane parallel to that of the snapping-rolls, and at one side thereof and inclined downwardly from front to rear, a passage-way in the frame between the two sets of rolls, the forward ends of the finishing-rolls being located adjacent to said passage-way in the frame leading from the snapping-rolls; an elevator located adjacent to the rear ends of the finishing-rolls to receive the ears from the latter, and a hopper above the finishing-rolls.

2. In a corn-husker, the combination with a chamber located at one side of the machine, of parallel partitions, the forward ends of which constitute gathering-arms, one of said partitions being formed with a passage-way for the ears, a pair of snapping-rolls inclined upwardly from front to rear and adapted to receive the stalks from the gathering-arms, means for feeding the stalks rearward to the snapping-rolls, a pair of finishing-rolls located in a vertical plane parallel to that of the snapping-rolls and at one side of the latter, and inclined downwardly from front to rear, the forward ends of the finishing-rolls being adapted to receive the ears through the passage-way in the frame, a hopper above the finishing-rolls, and an elevator located at the rear of the finishing-rolls.

JAMES W. WARRICK.

Witnesses:
F. H. BIGGS,
C. E. JONES.